United States Patent

[11] 3,542,224

[72] Inventor William H. Warren
    West Brookfield, Massachusetts 01585
[21] Appl. No. 803,710
[22] Filed March 3, 1969
[45] Patented Nov. 24, 1970

[54] TRANSFERRING ARTICLES FROM A CLOSE ARRANGEMENT TO A SPREAD FORMATION
10 Claims, 4 Drawing Figs.
[52] U.S. Cl................................................ 214/309,
    198/20; 198/34; 294/65, 294/87; 214/91
[51] Int. Cl........................................................ B65g 47/02
[50] Field of Search........................................... 214/1BS2,
    1BS3, 1BS4, 309, 91; 294/87A, 65; 198/20, 34

[56] References Cited
UNITED STATES PATENTS
3,209,923 10/1965 Bargel et al.................. 214/1
3,360,102 12/1967 Cummings................... 198/31

Primary Examiner—Albert J. Makay
Attorney—Charles R. Fay

ABSTRACT: A pair of plates with chucks on each in three parallel rows close together for picking up six rows of articles in a close together arrangement, the plates moving to another area in spread apart condition, and a series of rollers receiving all the articles in six evenly spread out rows.

Patented Nov. 24, 1970     3,542,224
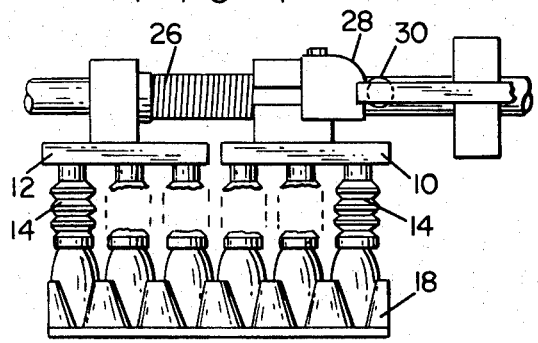
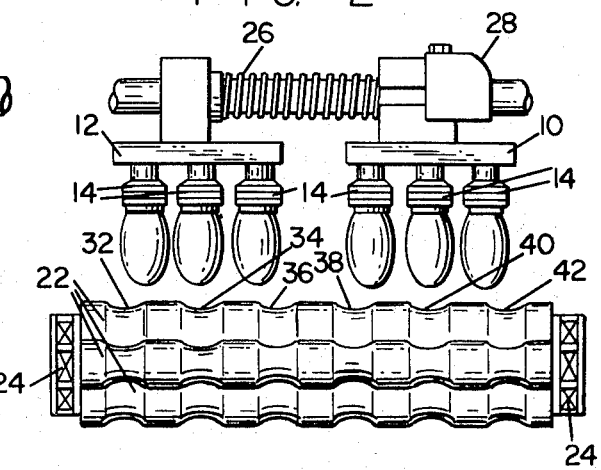
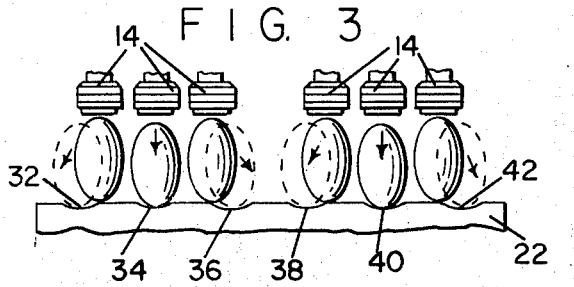
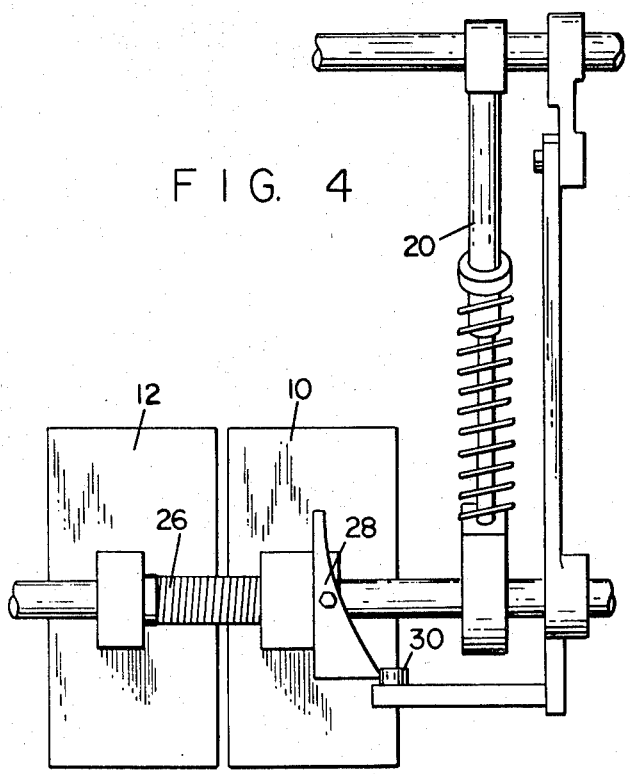
INVENTOR
WILLIAM H WARREN
BY *Charles R. Fay*
ATTORNEY 3,542,224

TRANSFERRING ARTICLES FROM A CLOSE ARRANGEMENT TO A SPREAD FORMATION

BACKGROUND OF THE INVENTION

In the processing of e.g. eggs, it is necessary to transfer them from the collection trays to conveyors for washing and other functions. The eggs in the trays are relatively closely arranged in rows, but the conveyor for the washing or grading machine must pass the eggs along in more widely spaced rows. This has been accomplished in the past by the use of egg suction chucks to pick up the eggs from the trays and transfer them to the conveyor for the ensuing washing machine, etc.

The washing machine conveyor comprises an endless belt of transverse rollers with generally annular peripheral dividers on them to hold the eggs in long separated rows, and these dividers are mutually spaced just enough to tend to guide the eggs after they are released from the chucks into the desired relationship.

However the dividers often cause eggs to break and they do not cause the eggs to be uniformly arranged, unless perfectly adjusted, and such maladjustment is undesirable in the succeeding washing or grading machine.

SUMMARY OF THE INVENTION

In this invention, a pair of plates each with close rows of chucks are brought together at the egg tray location. The chucks are arranged like the eggs and pick up a full complement, e.g. six rows of five eggs each. The two plates move to the roller conveyor and spread apart leaving two spaced sets each having three closed rows of eggs, and these are deposited in this relation on the rollers.

The rollers are transversely mounted on belts or chains and are spaced just enough to support the eggs. In the present case however, each roller has six annular grooves that are spaced apart to a degree greater than the spacing of the rows of eggs in the trays and on the individual chuck plates. These grooves are circumferentially concave, i.e., they have a curved conformation, and the effect is that the center row of eggs on each plate (of three rows) is aligned with and is deposited in the grooves (between a pair of rollers) that are the second set of grooves in from each end of the rollers; the other two rows of eggs are misaligned with respect to the two outermost grooves, but the action of the annular concave grooves is to cause these eggs to slide off, from the respective center rows of eggs, spreading them out and ensuring that they come to rest in the grooves provided for them.

BRIEF DESCRIPTION OF THE DRAWINGS

FIG. 1 is a view in elevation showing the relation between the egg chucks and the eggs at the pickup area;

FIG. 2 is a similar view showing the relation of the egg chucks to the receiving rollers;

FIG. 3 is a similar view illustrating the action of the released eggs on the rollers, and FIG. 4 is a detail view of the means spreading the plates.

PREFERRED EMBODIMENT OF THE INVENTION

In FIG. 1 there are shown two plates 10 and 12 each with three rows of vacuum egg chucks 14 of well known design. The plates contain chambers that are exhausted through pipes 16. The egg tray is indicated at 18 and it has six rows of eggs therein that are aligned with the six rows of egg chucks because the two plates 10 and 12 are close together.

A relatively simple pivot arm 20 construction swings the two plates and the eggs in an arc to a position over the rollers 22, these being transversely arranged between and connected to chains 24 for traveling the eggs to a processing machine, e.g. a washer. Reference is made to my copending application Ser. No. 615,692, filed Oct. 13, 1967 now U. S. Pat. No. 3,437,096 in this regard. The chuck plates remain horizontal at all times.

A spring 26 is tensioned between the plates in FIG. 1, but as the arm at 20 swings toward the rollers 22, a cam 28, FIG. 4, moves relative to a cam follower 30 to relieve the spring so it can push one plate away from the other a predetermined distance but when the chuck plates return to the FIG. 1 position, the cam again pushes the plates together, stressing the spring.

Each roller 22 has six concave annular grooves 32, 34, 36, 38, 40, and 42, and these are aligned longitudinally of the conveyor to receive and cradle the individual eggs. These depression or cradle forming grooves are spaced apart evenly but to a greater extent than the eggs in the trays FIG. 1, and also to a greater extent than the three rows of egg chucks on each plate 10 and 12, as is clearly apparent in FIG. 2. By spreading the chuck plates, FIG. 2, the center row of each plate is however aligned with respective grooves 34 and 40, the second grooves inwardly from the ends of the rollers, and the outer two rows of eggs on each plate are evenly spaced from but not aligned with roller grooves 32 and 36 as to one chuck plate and roller grooves 38 and 42 as to the other chuck plate. Hence the center eggs are deposited in the grooves predetermined for them, but the eggs of the respective outer rows of each chuck plate are deposited on the rollers just short of the respective roller grooves for which they are destined.

However, these eggs then automatically move out away from the central eggs and come to rest lightly and easily in the respective cradles formed by the respective grooves. This action apparently is a natural function of the egg shapes rolling on the rollers, and of course they do not roll any farther than the respective grooves because they slide or fall into the same which form receptacles for them.

This invention provides for evenly spreading all the rows of eggs from the close formation, FIG. 1, to an equally even but spread formation FIGS. 2 and 3, with but two groups of rows of eggs, and it is not necessary to provide positive spreading means. The dividers of the prior art are done away with and the eggs do not break.

Multiple units of plates 10, 12 can be utilized to increase production, and such multiple units may easily be activated concurrently in the same manner.

It should be noted that power to close the plates 10, 12 is derived directly through the lifter lever mechanism so that a cooperative actuation of the leveler action and the spreading action of the plates is achieved.

I claim:

1. Article transfer mechanism comprising means carrying a plurality of articles in a plurality of relatively closely spaced rows, and a conveyor, means on the conveyor for carrying a plurality of articles in a plurality of relatively more widely spaced rows;

means picking up the rows of articles from said first-named means and transferring the same to the conveyor, the pickup means maintaining the spacing of the rows of articles of the first-named means; and means on the conveyor causing the article rows to relatively spread apart upon release of the articles onto the conveyor from the pickup means, the means on the conveyor comprising depressions in rows spaced apart to a greater degree than the spacing of the rows on the pickup means and on the first-named means.

2. The article transfer of claim 1 wherein said conveyor comprises a series of rollers.

3. The article transfer of claim 1 wherein said conveyor comprises a series of rollers, the depressions being in the rollers.

4. The article transfer of claim 1 wherein said conveyor comprises a series of rollers, annular grooves in the rollers forming the depressions.

5. The article transfer of claim 1 wherein said conveyor comprises a series of rollers, annular grooves in the rollers forming the depressions, grooves in adjacent rollers being aligned.

6. The article transfer of claim 1 including a second article pickup means, means to relatively closely space the two-article pickup means at the area of article pickup at the article carrying means, and means to spread the two-article pickup means apart at the conveyor.

7. The article transfer of claim 1 wherein said conveyor comprises a series of rollers, annular grooves in the rollers forming the depressions, there being aligned grooves in adjacent rollers in a spaced series longitudinally of the rollers.

8. The article transfer of claim 1 wherein said conveyor comprises a series of rollers, annular grooves in the rollers forming the depressions, there being aligned grooves in adjacent rollers in a spaced series longitudinally of the rollers, and there being one pair of aligned grooves in adjacent rollers for each article.

9. The article transfer of claim 1 wherein said conveyor comprises a series of rollers, annular grooves in the rollers forming the depressions, said grooves being concave.

10. The article transfer of claim 1 wherein said conveyor comprises a series of rollers, annular grooves in the rollers forming the depressions, the rollers being otherwise free and clear and unencumbered.